US012771185B2

(12) United States Patent
Herrada et al.

(10) Patent No.: US 12,771,185 B2
(45) Date of Patent: Oct. 20, 2026

(54) STATOR BODY FOR AN ELECTRIC MOTOR, STATOR, ELECTRIC MOTOR, AND ASSOCIATED MANUFACTURING METHOD

(71) Applicant: VALEO SYSTÈMES D'ESSUYAGE, Le Mesnil Saint Denis (FR)

(72) Inventors: Jose Luis Herrada, Le Mesnil Saint Denis (FR); Mehdi Belhaj, Le Mesnil Saint Denis (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 199 days.

(21) Appl. No.: 18/697,068

(22) PCT Filed: Sep. 30, 2022

(86) PCT No.: PCT/EP2022/077319
§ 371 (c)(1),
(2) Date: Mar. 29, 2024

(87) PCT Pub. No.: WO2023/052604
PCT Pub. Date: Apr. 6, 2023

(65) Prior Publication Data

US 2024/0413672 A1 Dec. 12, 2024

(30) Foreign Application Priority Data

Sep. 30, 2021 (FR) ....................................... 2110381

(51) Int. Cl.
*H02K 1/14* (2006.01)
*H02K 1/16* (2006.01)
(Continued)

(52) U.S. Cl.
CPC ............. *H02K 1/146* (2013.01); *H02K 1/165* (2013.01); *H02K 1/187* (2013.01); *H02K 3/525* (2013.01);
(Continued)

(58) Field of Classification Search
CPC ........ H02K 1/146; H02K 1/165; H02K 1/187; H02K 3/525; H02K 15/022; H02K 15/095; H02K 2203/12; H02K 3/522
See application file for complete search history.

(56) References Cited

U.S. PATENT DOCUMENTS

2004/0124733 A1* 7/2004 Yamamoto .............. B29C 70/72 29/596
2014/0125188 A1* 5/2014 Marvin .................. H02K 3/522 310/216.058
2019/0006894 A1 1/2019 Kobayashi et al.

FOREIGN PATENT DOCUMENTS

JP 2014-222978 A 11/2014
WO 2016-177500 A1 11/2016

OTHER PUBLICATIONS

International Search Report in corresponding International Application No. PCT/EP2022/077319, dated Jan. 18, 2023 (5 pages).
(Continued)

*Primary Examiner* — Christopher M Koehler
*Assistant Examiner* — Riley Owen Stout
(74) *Attorney, Agent, or Firm* — Osha Bergman Watanabe & Burton LLP

(57) ABSTRACT

A stator for an electric motor is disclosed. The stator includes a star including a plurality of radially extending teeth, and a plurality of bobbins configured firstly to receive turns of a winding wire in order to form a plurality of coils, and secondly to be positioned on the respective teeth of the star. The teeth include an end part the cross section of which is constant. The bobbins include a first end of a flared shape, a second end opposite to the first end and of a flared shape, and a central part positioned between the first end and the second end. The cross section of the central part is smaller in comparison with the cross section of the first end and the second end.

12 Claims, 6 Drawing Sheets

(51) Int. Cl.

| | |
|---|---|
| ***H02K 1/18*** | (2006.01) |
| ***H02K 3/52*** | (2006.01) |
| ***H02K 15/022*** | (2025.01) |
| ***H02K 15/095*** | (2006.01) |

(52) U.S. Cl.
CPC ......... *H02K 15/022* (2013.01); *H02K 15/095* (2013.01); *H02K 2203/12* (2013.01)

(56) References Cited

OTHER PUBLICATIONS

Written Opinion in corresponding International Application No. PCT/EP2022/077319, dated Jan. 18, 2023 (7 pages).

* cited by examiner

STATOR BODY FOR AN ELECTRIC MOTOR, STATOR, ELECTRIC MOTOR, AND ASSOCIATED MANUFACTURING METHOD

BACKGROUND OF THE INVENTION

The present invention relates to the field of electric motors, and in particular to electric motors intended to equip electric bicycles.

Electric bicycles are becoming increasingly popular because of the ease of travel they provide while consuming less energy, having a lower environmental impact and costing less.

However, the use of an electric motor in an electric bicycle involves a number of constraints. In particular, it is necessary to provide a significant torque while limiting the weight and bulk of the electric motor as much as possible.

In order to limit the bulk, it is known practice to use stators 1 in two parts also referred to as stators 1 with separate teeth, in which the stator 1 comprises an inner part referred to as the star 3 comprising the teeth 30 around which the coils 13 are positioned, and an outer part referred to as the yoke 5 arranged around the teeth 30 as depicted for the stator 1 in FIG. 1. The coils 13 are for example made from a winding wire 17 wound in the form of layers of turns around a bobbin 15 which is then attached to the tooth 30 of the star 3.

The use of such a stator 1 makes it possible to provide more space for the winding and therefore to maximize the available space and facilitate winding of the winding wire around the teeth 30. In addition, in order to maximize the ratio between the number of turns of the coils 13 and the size thereof, it is known practice to use what is referred to as trapezoidal winding in which the number of layers of turns varies between the two ends of the coil 13. FIG. 2 depicts one example of such winding performed around a bobbin 15 with three layers of turns, the third layer being incomplete.

However, with such winding, the last turn of the winding, which is the turn situated at the center of the winding (indicated by an arrow in FIG. 3) tends to be very close to the adjacent coil when mounted on the star 3 and may come into contact with the last turn of the adjacent coils, causing shorting between the coils 13. This shorting may lead to malfunctioning of or even damage to the electric motor.

It is therefore appropriate to provide a solution that allows the last turns of the adjacent coils to be kept further apart in order to reduce or eliminate the risk of shorting between the coils 13 of the stator.

BRIEF SUMMARY OF THE INVENTION

To this end, the subject matter of the invention is therefore a stator for an electric motor, comprising:

- a star comprising a plurality of radially extending teeth,
- a plurality of bobbins configured firstly to receive turns of a winding wire in order to form a plurality of coils, and secondly to be positioned on the respective teeth of the star, wherein the teeth comprise an end part the cross section of which is constant and in that the bobbins have a first end of flared shape, a second end opposite to the first end and of flared shape, and a central part positioned between the first end and second end, the cross section of the central part being smaller in comparison with the cross section of the first end and second end.

According to another aspect of the present invention, the teeth also comprise a proximal part, in relation to the radial direction, of convergent overall shape and the flared shape of the first end of the bobbins has a shape that complements the proximal part of the teeth so that the flared shape of the first end of the bobbin is configured to come into contact with the convergent proximal part of the tooth, thereby reducing magnetic losses.

According to another aspect of the present invention, the convergent shape of the tooth and the flared shape of the ends of the bobbin apply to at least the sides of the tooth and of the bobbin that face an adjacent tooth.

According to another aspect of the present invention, the bobbins are configured to accept a plurality of layers of turns, the last layer of turns being produced on only part of the height of the bobbin in order to form trapezoidal winding.

According to another aspect of the present invention, the part of the height of the bobbin that comprises the last layer of turns corresponds to the radially outer part when the bobbin is mounted on the tooth.

According to another aspect of the present invention, the stator also comprises a yoke of cylindrical overall shape configured to be positioned around the star and the coils.

According to another aspect of the present invention, the yoke comprises a plurality of axial slots arranged on its internal face and configured to accept the ends of the teeth.

According to another aspect of the present invention, the yoke and the star are formed by cutting from a stack of sheet-metal laminations configured to be superposed axially.

According to another aspect of the present invention, the bobbins are made of plastic.

The present invention also relates to an electric motor comprising a stator as described above.

The present invention also relates to a method for manufacturing a stator, comprising:

- a step of winding a winding wire around a bobbin comprising a first end of flared shape and a second end of flared shape, these ends being connected by a central part of smaller cross section than the first end and second end so as to form a coil with trapezoidal winding of which the last turn of the winding is positioned facing the central part of the bobbin, the winding step being repeated to form all of the coils of the stator,
- a step of positioning the coils formed around the bobbins on the respective teeth of a star of the stator body,
- a step of inserting the star equipped with the coils into the yoke using axial translation.

According to another aspect of the present invention, the manufacturing method also comprises preliminary steps of forming the star and the yoke from a stack of sheet-metal laminations superposed in an axial direction, the star and the yoke being obtained by cutting out the sheet-metal laminations.

Further features and advantages of the invention will become more clearly apparent from reading the following description, which is given by way of illustrative and non-limiting example, and the appended drawings, in which:

In these figures, elements that are identical bear the same reference signs. The following embodiments are examples. Although the description refers to one or more embodiments, this does not necessarily mean that each reference relates to the same embodiment, or that the features apply only to a single embodiment. Individual features of various embodiments may also be combined or interchanged to create other embodiments.

DETAILED DESCRIPTION OF THE INVENTION

In the present description, certain elements or parameters may be indexed, for example first element or second element and also first parameter and second parameter or first criterion and second criterion, etc. In this case, this is simply indexing to differentiate and designate elements or parameters or criteria that are similar but not identical. This indexing does not imply priority being given to one element, parameter or criterion over another and such designations may be interchanged easily without departing from the scope of the present description. Neither does this indexing imply any chronological order for example in assessing any given criterion.

Figure 1:
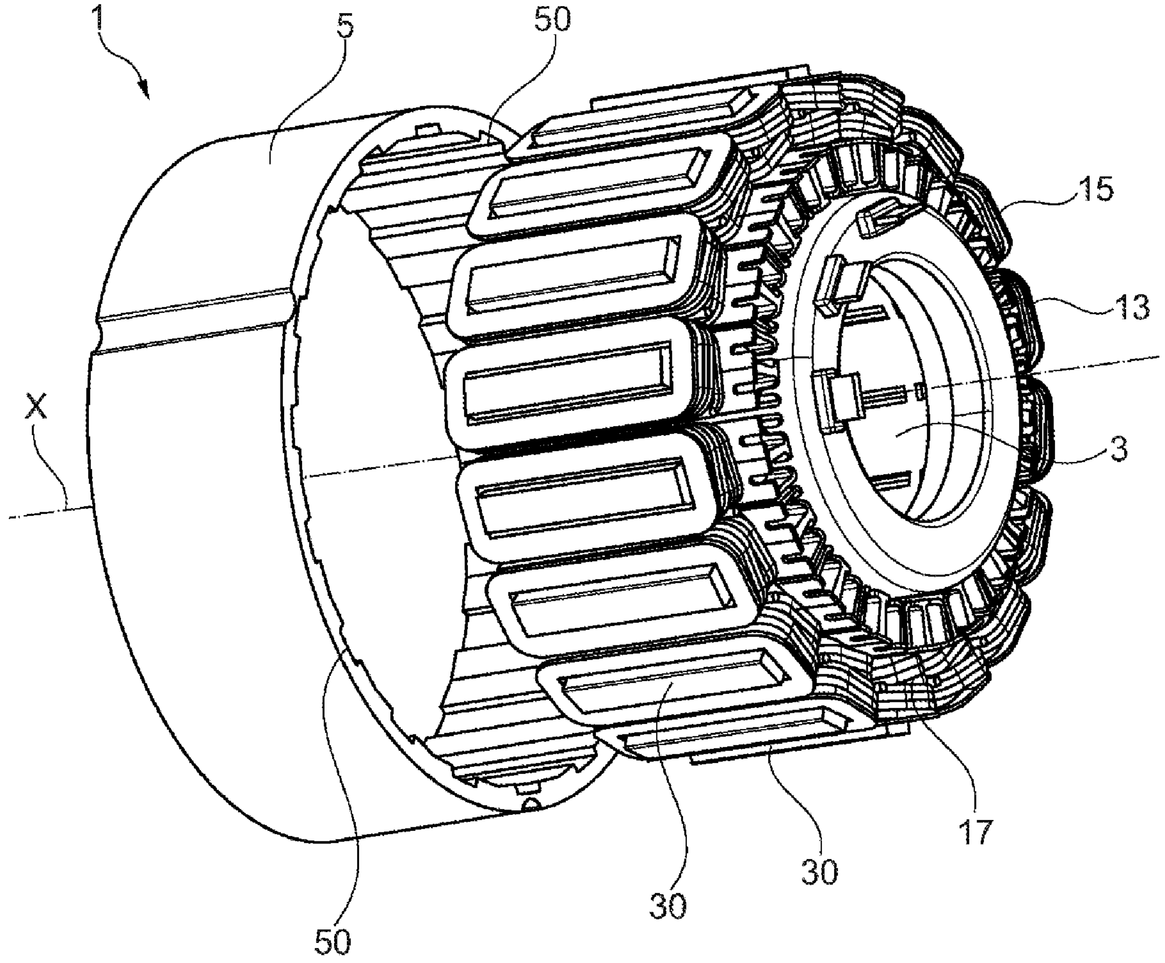
FIG. 1 shows a schematic perspective view of a stator of an electric motor.
Figure 2:
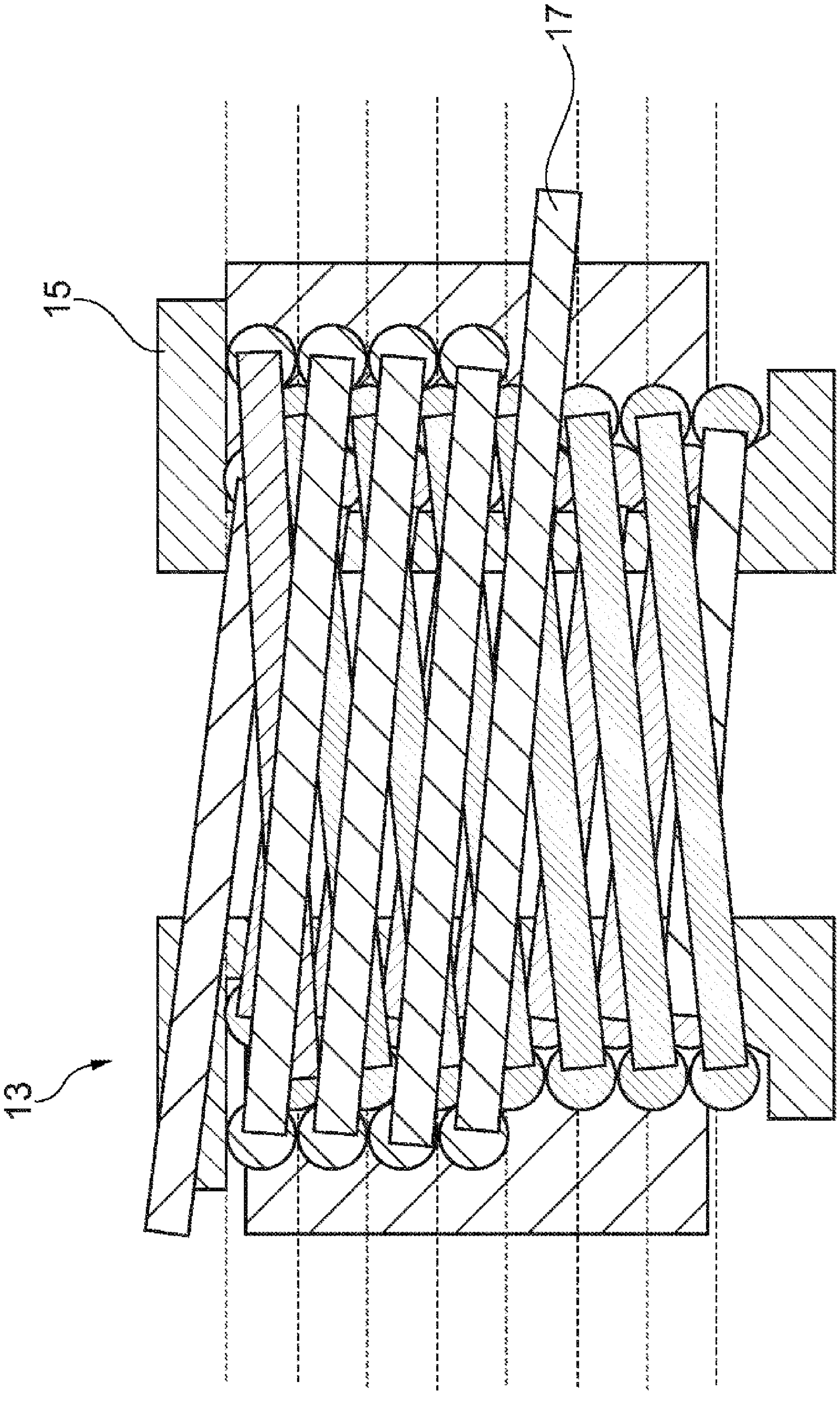
FIG. 2 shows a schematic view of a coil formed for winding wire wound around a bobbin.
Figure 3:
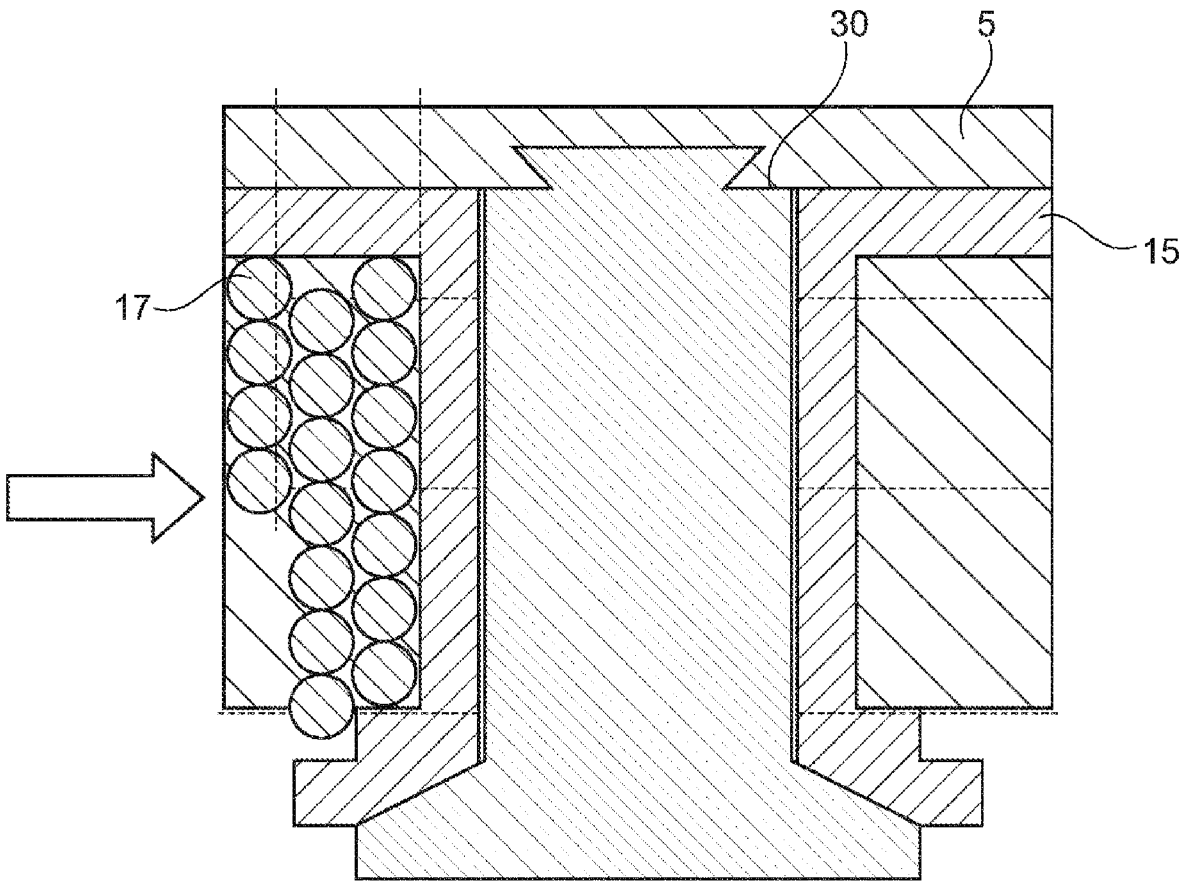
FIG. 3 shows a schematic sectioned view of a tooth and of a coil of a stator.
Figure 4:
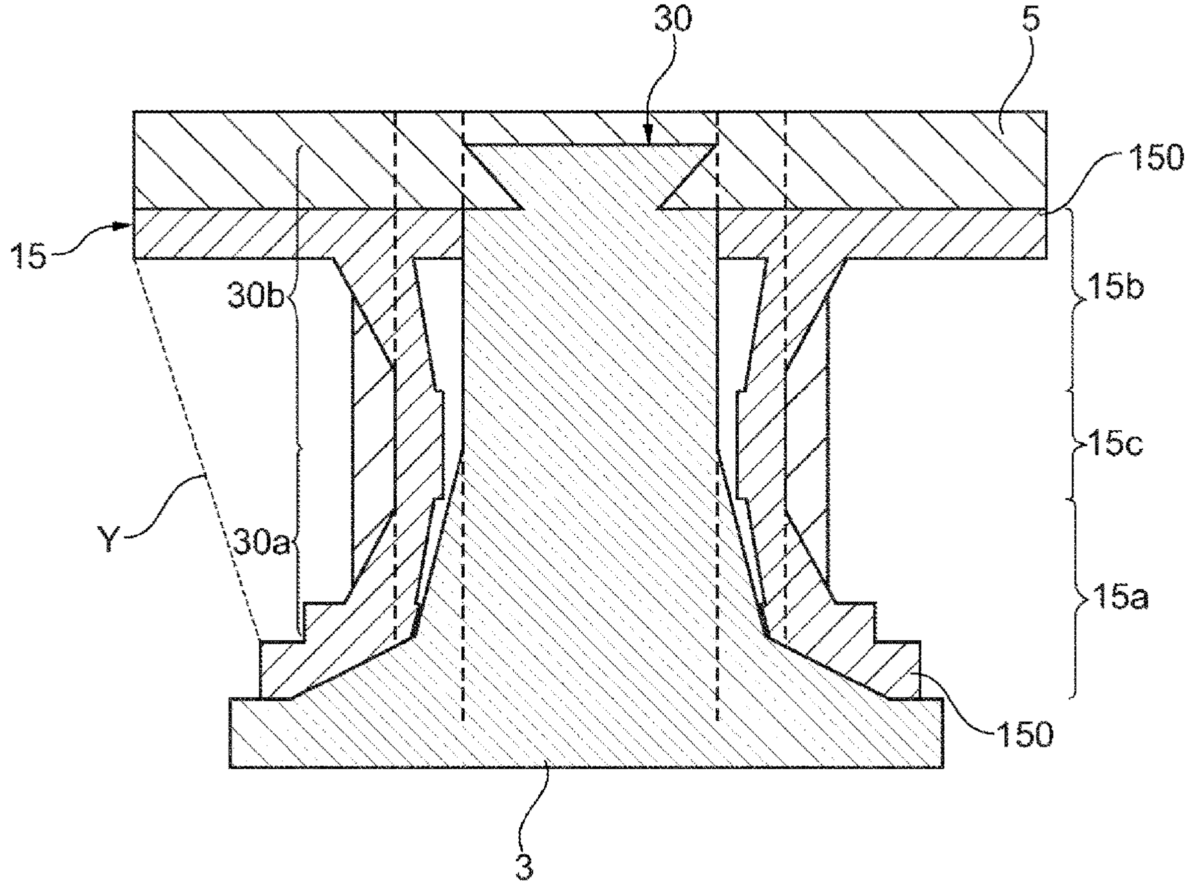
FIG. 4 shows a schematic sectioned view of a tooth of a stator body and of a bobbin according to a first embodiment of the present invention.

The present invention relates to a stator 1 for an electric motor, particularly to a stator with separate teeth 30 and in which the coils 13 are formed around bobbins 15 that are configured to be positioned on the teeth 30 of a star 3 of a stator body, as depicted in FIG. 1. In FIG. 1, the stator 1 comprises eighteen coils 13 although a different number of coils 13 may be used. The stator body comprises for example a star 3 comprising a plurality of radially extending teeth 30. The teeth 30 are distributed uniformly about the star 3. The stator body also comprises a yoke 5 of cylindrical overall shape comprising axial slots 50 and configured to be positioned around the star 3 and the coils 13. The ends of the teeth 30 of the star 3 and the slots 50 of the yoke have complementing shapes, for example rectangular shapes as depicted in FIG. 1, or dovetail shapes as depicted in FIG. 4. However, the invention is not limited to these shapes of slots 50 and of teeth 30. The yoke 5 is configured to be placed around the star using axial translation along the axis X depicted in FIG. 1. In practice, the star 3 and the yoke 5 are generally obtained from a stack of sheet-metal laminations superposed in an axial direction and assembled with one another, for example by interlocking or grafting. Each sheet-metal lamination is thus cut out so as to obtain, on the one hand, a slice of star 3 and on the other hand, a slice of yoke 5. The coils 13 are formed for example by winding turns of a winding wire 17 around a bobbin 15. In order to minimize the bulk of the stator 1, the coils 13 are produced by trapezoidal winding where several layers of turns of the winding wire 17 are wound one on top of the other and the last layer of turns is produced on only part of the height of the bobbin 15, particularly the radially outer part of the bobbin 15 (when the bobbin is mounted on the star 3) as depicted in FIGS. 2 and 3. In addition, in order to limit the width of the coil 13 at the last turn of the winding (which is indicated by the arrow in FIG. 3), the bobbin 15 has an hourglass overall shape with a first end 15*a*, corresponding to the internal end (when the bobbin is mounted on the star 3), of flared shape, and a second end 15*b*, corresponding to the external end (when the bobbin is mounted on the star 3), of flared shape. The flared shape of the ends 15*a*, 15*b* of the bobbin 15 applies to at least those sides of the bobbin 15 that are intended to face an adjacent bobbin 13 when the stator 1 is fully assembled. The flared shapes are, for example, linear shapes as in FIGS. 4 and 5, although curved shapes are equally possible. In addition, the shape of the flare (the flare angle in the case of a linear shape) is determined in such a way as to maximize the number of turns contained inside the volume formed by the ends of the bobbin 15 (which volume is delimited by the dotted line referenced Y in FIG. 4) while at the same time maintaining trapezoidal winding (where the number of layers of turns is greater on the outer part of the bobbin 15 (when that bobbin is mounted on the star 3)).

The central part 15*c* of the bobbin 15, which part is situated between the first end 15*a* and second end 15*b*, has a smaller cross section in comparison with the first end 15*a* and second end 15*b*. This central part 15*c* of smaller cross section is intended to receive the turns of the winding wire 17 that are situated underneath the last turn of the winding (the last turn of the winding is positioned facing the central part 17*c* of the bobbin 17) and thus limit the lateral bulk of the coil 13 at the last turn. The second end 15*b* may also have a flange 150 for retaining the turns of the winding wire 17. The first end 15*a* may also have such a flange 150 for retaining the turns of the winding wire 17. The bobbin 15 is made for example of plastic.

According to a first embodiment depicted in FIG. 4, the teeth 30 have a proximal part 30*a* in relation to the center of the star 3 of a shape that overall is convergent in the radial direction, which means to say in the direction away from the center of the star, and an end part 30*b* in the radial direction where the cross section is constant, namely which is of linear overall shape. The proximal part 30*a* is configured to accept the first end 15*a* of the bobbin 15 so that the flared shape of the first end 15*a* of the bobbin 15 has a shape that complements the proximal part 30*a* of the teeth 30. This convergent shape of the proximal part 30*a* that complements the first end 15*a* of the bobbin 15 makes it possible to limit magnetic losses.

Figure 5:
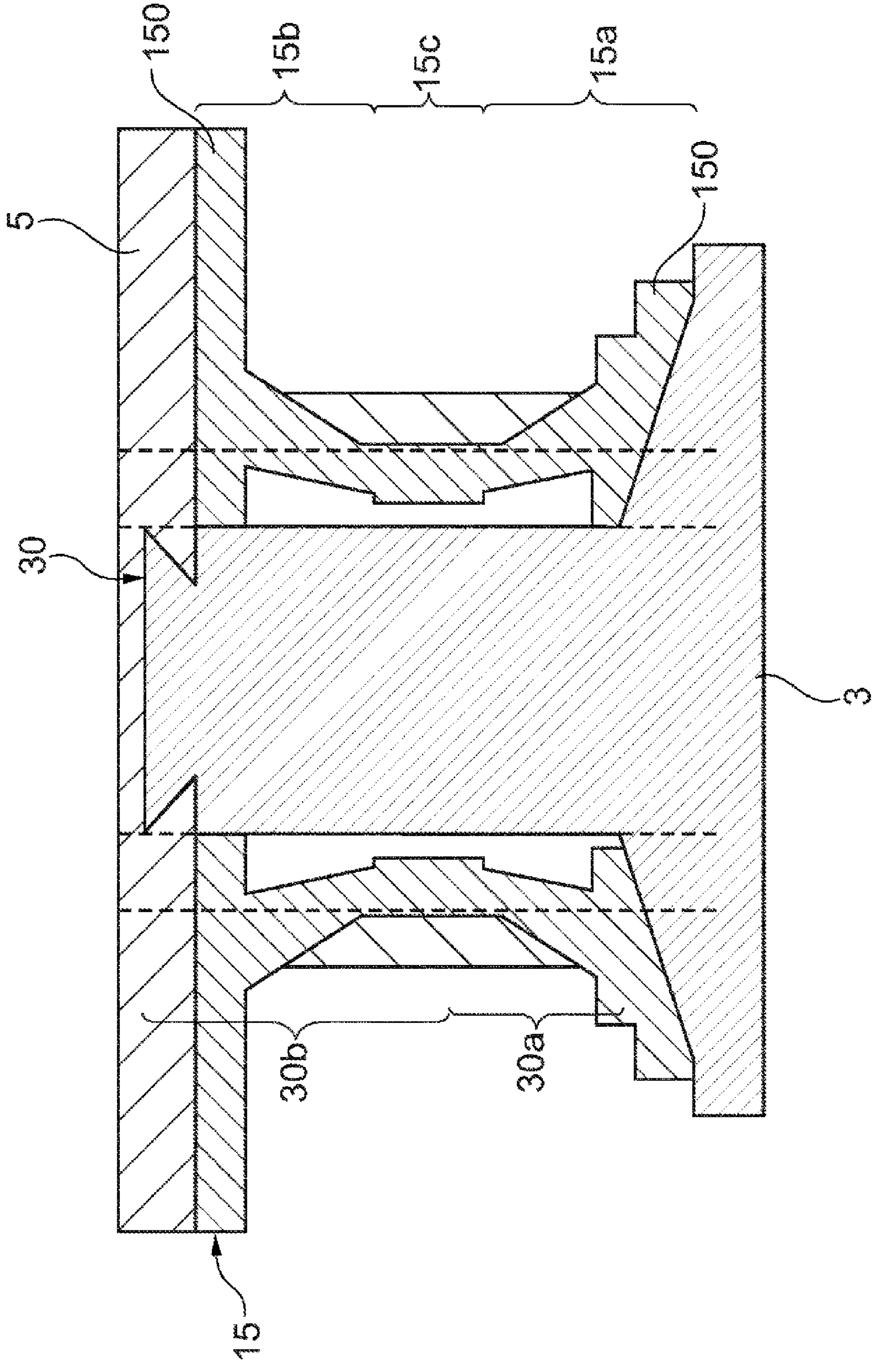
FIG. 5 shows a schematic sectioned view of a tooth of a stator body and of a bobbin according to a second embodiment of the present invention.

According to a second embodiment depicted in FIG. 5, the teeth 30 have a constant cross section, which is to say a linear overall shape.

The present invention also relates to an electric motor comprising a stator 1 as described above. The electric motor is, for example, a three-phase motor.

Figure 6:
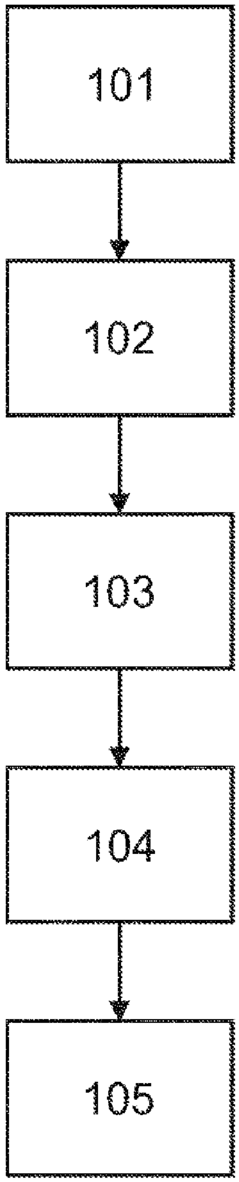
FIG. 6 shows a flowchart of the steps for manufacturing a stator according to the present invention.

The present invention also relates to a method for manufacturing a stator 1 as described above. FIG. 6 is a flowchart of the steps in the manufacturing method according to the present invention.

The first step 101 concerns the stacking of sheet-metal laminations that are intended to form the star and the yoke 5 of the stator 1 in an axial direction and the securing of the sheet-metal laminations together, for example by interlocking or grafting. The laminations are sheet-metal, for example steel, laminations. The thickness of the sheet-metal laminations is for example 0.3 mm. The stack has a substantially cylindrical shape.

The second step 102 concerns a step of cutting the laminations stack obtained in step 101. Cutting makes it possible to form, on the one hand, a star 3 comprising a plurality of uniformly radially extending teeth 30 and, on the other hand, a yoke 5 comprising a plurality of slots 50 having a shape complementary to the ends of the teeth 30.

The ends of the teeth 30 and the slots 50 may have rectangular or dovetail shapes, for example.

The third step 103 concerns the winding of a plurality of turns of a winding wire 17 around an hourglass-shaped bobbin 15 so as to form a coil 13 with trapezoidal winding. The bobbin comprises a first end 15*a* of flared shape and a second end 15*b* of flared shape, these ends being connected by a central part 15*c* of smaller cross section than the first end 15*a* and second end 15*b*. This winding is repeated to form all of the coils 13 of the stator 1.

The fourth step 104 concerns the positioning of the coils 13 formed in step 103 on the teeth 30 of the star 3, the bobbins 15 being secured to the respective teeth 30 of the star 3.

The fifth step 105 concerns the positioning of the yoke 5 around the star 3 comprising the coils 13. The positioning is carried out by axial translation.

The invention claimed is:

1. A stator for an electric motor, the stator comprising:

a star comprising a plurality of radially extending teeth, and a plurality of bobbins configured firstly to receive turns of a winding wire in order to form a plurality of coils, and secondly to be positioned on the respective teeth of the plurality of radially extending teeth of the star, wherein a tooth of the plurality of radially extending teeth comprises an end part the cross section of which is constant, and wherein a bobbin of the plurality of bobbins comprises:

a first end of flared shape, a second end of flared shape opposite to the first end, and a central part positioned between the first end and the second end, wherein the cross section of the central part is smaller in comparison with the cross section of the first end and the second end.

2. The stator as claimed in claim 1, wherein the tooth also comprises a proximal part of convergent overall shape, and wherein the flared shape of the first end of the bobbin has a shape that complements the proximal part of the tooth.

3. The stator as claimed in claim 2, wherein the convergent shape of the tooth and the flared shape of the first end and the second end of the bobbin apply to at least the sides of the tooth and of the bobbin that face an adjacent tooth of the plurality of radially extending teeth.

4. The stator as claimed in claim 1, wherein the bobbins is configured to accept a plurality of layers of turns, wherein the last layer of turns is produced on only part of the height of the bobbin in order to form trapezoidal winding.

5. The stator as claimed in claim 4, wherein the part of the height of the bobbin that comprises the last layer of turns corresponds to the radially outer part when the bobbin is mounted on the tooth.

6. The stator as claimed in claim 1, further comprising a yoke of cylindrical overall shape configured to be positioned around the star and the plurality of coils.

7. The stator as claimed in claim 6, wherein the yoke comprises a plurality of axial slots arranged on its internal face and configured to accept the ends of the plurality of radially extending teeth.

8. The stator as claimed in claim 1, wherein the yoke and the star are formed by cutting from a stack of sheet-metal laminations configured to be superposed axially.

9. The stator as claimed in claim 1, wherein the plurality of bobbins is made of plastic.

10. An electric motor comprising a stator as claimed in claim 1.

11. A method for manufacturing a stator, the manufacturing method comprising:

winding a winding wire around a bobbin comprising a first end of flared shape and a second end of flared shape, wherein the first and second ends are connected by a central part of smaller cross section than the first end and second end so as to form a coil with trapezoidal winding of which the last turn of the winding is positioned facing the central part of the bobbin, wherein the winding step is repeated for each bobbin of a plurality of bobbins to form the coils of the stator, positioning the coils formed around each bobbin on the respective teeth of a plurality of radially extending teeth of a star of a body of the stator, inserting the star equipped with the coils into a yoke using axial translation.

12. The manufacturing method as claimed in claim 11, further comprising preliminary steps of forming the star and the yoke from a stack of sheet-metal laminations superposed in an axial direction, wherein the star and the yoke are obtained by cutting out the sheet-metal laminations.

* * * * *